US007471816B2

(12) United States Patent
Palmer

(10) Patent No.: US 7,471,816 B2
(45) Date of Patent: Dec. 30, 2008

(54) VIRTUAL RESOLUTION ENHANCEMENT IN DIAGNOSTIC IMAGING USING FEA

(76) Inventor: Mark L. Palmer, 1430 S. Maple, Ann Arbor, MI (US) 48103

( * ) Notice: Subject to any disclaimer, the term of this patent is extended or adjusted under 35 U.S.C. 154(b) by 357 days.

(21) Appl. No.: 11/433,521

(22) Filed: May 12, 2006

(65) Prior Publication Data

US 2007/0014459 A1    Jan. 18, 2007

Related U.S. Application Data

(60) Provisional application No. 60/680,076, filed on May 12, 2005.

(51) Int. Cl.
  *G06K 9/00* (2006.01)
(52) U.S. Cl. .................. 382/128; 382/131; 382/148; 345/423
(58) Field of Classification Search ............... 345/419, 345/423, 427; 378/4, 21; 382/128, 131, 382/148, 298, 299, 300
  See application file for complete search history.

(56) References Cited

U.S. PATENT DOCUMENTS

| 4,858,146 A | 8/1989 | Shebini |
| 5,574,658 A | 11/1996 | Ito |
| 6,823,297 B2 | 11/2004 | Jenny et al. |
| 6,980,922 B2 | 12/2005 | Henderson et al. |

OTHER PUBLICATIONS

S. J. Hollister, D. P. Fyhrie, K. J. Jepsen, and S. A. Goldstein, "Application of Homogenization Theory to the Study of Trabecular Bone Mechanics," J. Biomechanics, vol. 24, No. 9, 1991, pp. 825-839, Pergamon Press plc, Great Britain.*

John Z. Wu and Walter Herzog, "Simulating the swelling and deformation behaviour in soft tissues using a convective thermal analogy," BioMedical Engineering OnLine, Dec. 19, 2002, BioMed Central Ltd., www. biomedical-engineering-online.com/content/1/1/8.*

(Continued)

*Primary Examiner*—Matthew C. Bella
*Assistant Examiner*—Gregory F Cunningham

(57) ABSTRACT

A method is described for achieving resolutions beyond the resolution of a diagnostic imaging using multilevel computational analysis. This is accomplished by coupling the diagnostic image with images obtained at higher resolutions or with physiological models constructed at size scales beyond the resolution of the original diagnostic image. Using a discretization function, the image data or models are converted or generated so that they can be processed by a multilevel computational analysis function. The multilevel analysis then mathematically couples the models across two or more length scales generating parameters of interest at each level of analysis. A post-processing function provides the interface for the user to view the parameters of interest in the model derived from the original diagnostic image and/or the image itself and then "zoom-in" to a region by accessing the higher resolution image and/or model associated with it and viewing the parameters of interest.

19 Claims, 6 Drawing Sheets

Illustration of the preferred embodiment of the VRE method

OTHER PUBLICATIONS

Fred S. Azar, Dimitris N. Metaxas, and Mitchell D. Schnall, "Methods for Modeling and Predicting Mechanical Deformations of the Breast Under External Perturbations," Medical Image Analysis, vol. 6, 2002, pp. 1-27, Elsevier Science B.V., www.elsevier.com/locate/media.

Timothy J. Carter, Maxime Sermesant, David M. Cash, Dean C. Barratt, Christine Tanner, David J. Hawkes, "Application Of Soft Tissue Modelling to Image-Guided Surgery," Medical Engineering & Physics vol. 27, 2005, pp. 893-909, Elsevier Science Ltd., www.elsevier.com/locate/medengphy www.sciencedirect.com.

Karen May-Newman and Andrew D. McCulloch, "Homogenization Modeling for the Mechanics of Perfused Myocardium," Progress in Biophysics & Molecular Biology, vol. 69, 1998, pp. 463-481, Pergamon, Elsevier Science Ltd.

Mark L. Palmer, "A Non-Linear Hierarchical Model of Stretch-Induced Injury to Skeletal Muscle Fibers," A dissertation submitted in partial fulfillment of the requirements for the degree of Doctor of Philosophy (Mechanical Engineering) in Rackham School of Graduate Studies, The University of Michigan, Ann Arbor, Michigan, 2002.

M. Sermesant, C. Forest, X. Pennec, H. Delingette, and N. Ayache, "Deformable Biomechanical Models: Application to 4D Cardiac Image Analysis," Medical Image Analysis, vol. 7, 2003, pp. 475-488, Elsevier Science Ltd., www.elsevier.com/locate/media, www.computerscienceweb.com.

Bruce H Smaill, Ian J Legrice, Darren A Hooks Andrew J Pullan, Bryan J Caldwell and Peter J Hunter, "Cardiac Structure and Electrical Activation: Models and Measurement," Proceedings of the Australian Physiological and Pharmacological Society Symposium: Integrating Cardiac Function: From Molecules to Man, Sep. 2003, Clinical and Experimental Pharmacology and Physiology, vol. 31, 2004, pp. 913-919, Bioengineering Institute and Department of Physiology, University of Auckland, Auckland, New Zealand.

Naoki Takano, Masaru Zako, and Manabu Ishizono, "Multi-scale computational method for elastic bodies with global and local heterogeneity," Journal of Computer-Aided Materials Design, vol. 7, 2000, pp. 111-132, Kluwer Academic Publishers.

Joseph C. Walker, Mark B. Ratcliffe, Peng Zhang, Arthur W. Wallace, Baharfata, Edward W. Hsu, David Saloner and Julius M. Guccione, "MRI-based finite-element analysis of left ventricular aneurysm," Am J Physiol Heart Circ Physiol, vol. 289, 2005, pp H692-H700, Mar. 18, 2005, American Physiological Society, 9650 Rockville Pike, Bethesda MD 20814-3991, www.the-aps.org.

Hiroshi Watanabe, Seiryo Sugiura, Hidenobu Kafuku, and Toshiaki Hisada, "Multiphysics Simulation of Left Ventricular Filling Dynamics Using Fluid-Structure Interaction Finite Element Method," Biophysical Journal, vol. 87, Sep. 2004, pp. 2074-2085, Computational Biomechanics Division, Institute of Environmental Studies, Graduate School of Frontier Sciences, The University of Tokyo, Bunkyo-ku Tokyo 113-0033, Japan.

Luzhong Yin and Dawn M. Elliot, "A Homogenization Model of the Annulus Fibrosus," Journal of Biomechanics, vol. 38, 2005, pp. 1674-1684, Elsevier Science Ltd., www.elsevier.com/locate/jbiomech, www.jbiomech.com.

Qing Yu and Jacob Fish, "Multiscale asymptotic homogenization for multiphysics problems with multiple spatial and temporal scales: a coupled thermo-viscoelastic example problem," International Journal of Solids and Structures, vol. 39, 2002, pp. 6429-6452, Elsevier Science Ltd., www.elsevier.com/locate/ijsolstr.

* cited by examiner

Figure 1: The structural hierarchy of skeletal muscle tissue (Palmer, 2002)
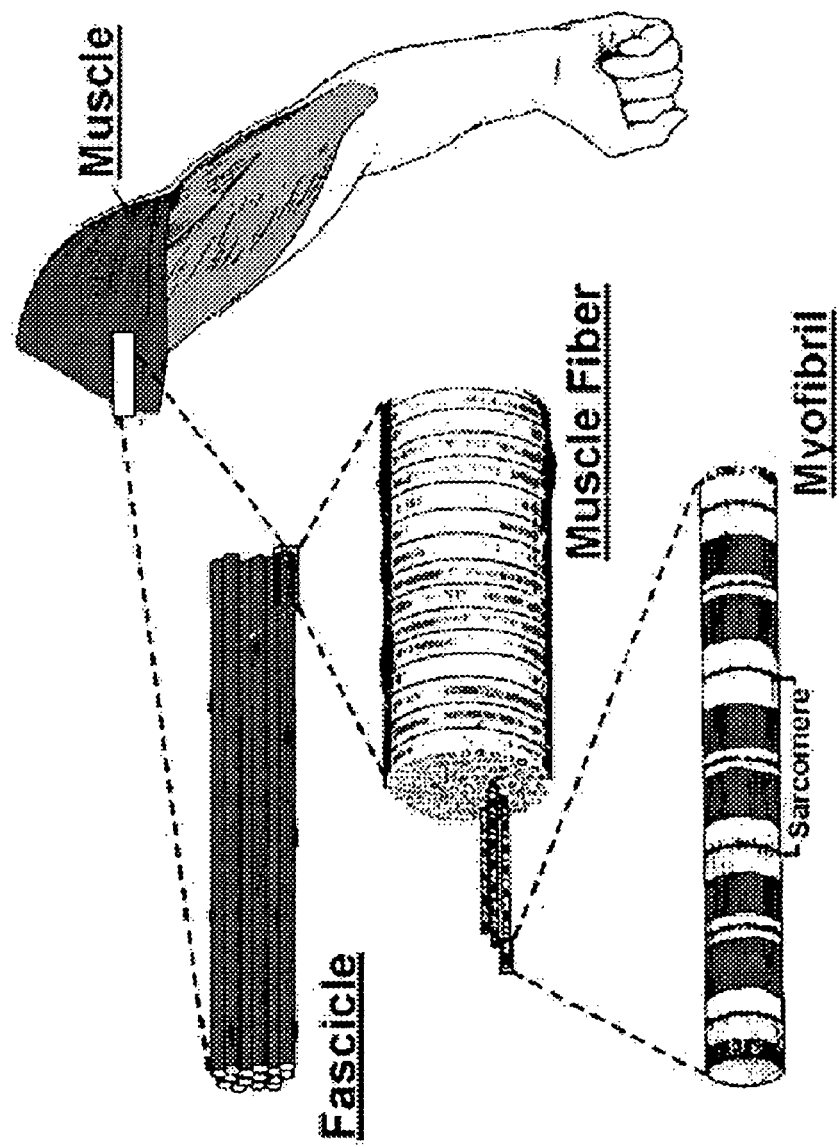

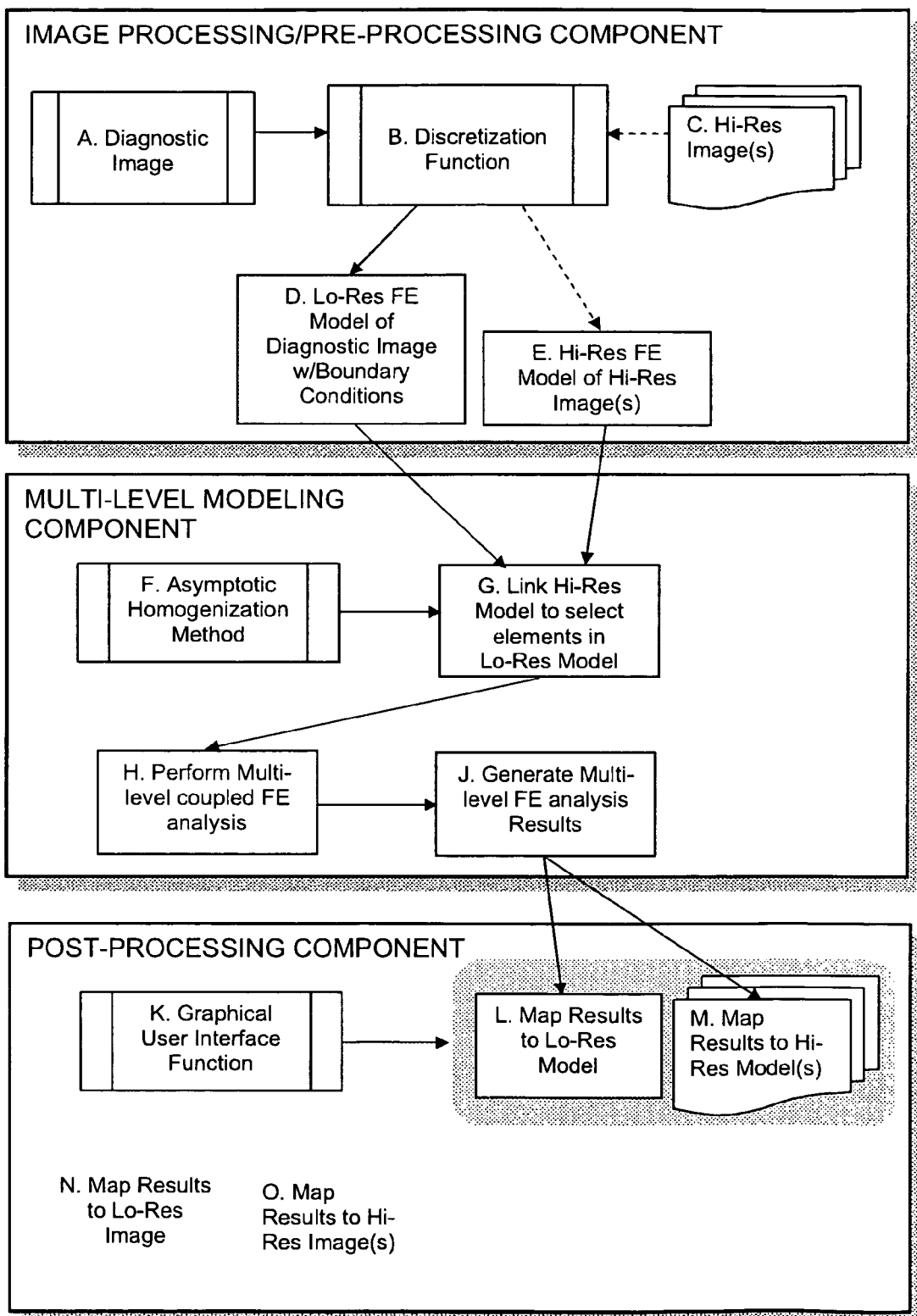
Figure 2: Illustration of the preferred embodiment of the VRE method

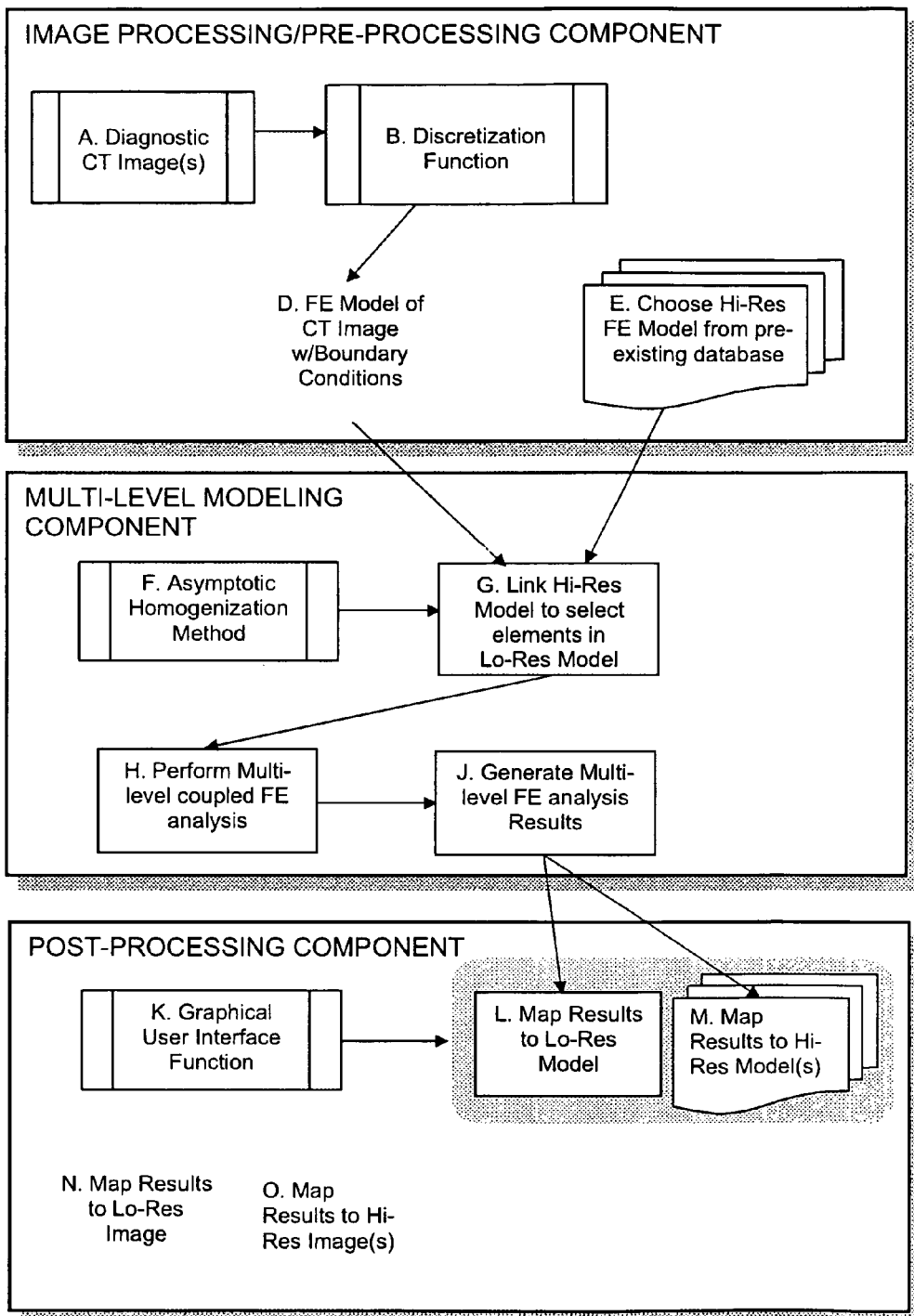
Figure 3: Illustration of preferred embodiment applied to ACS

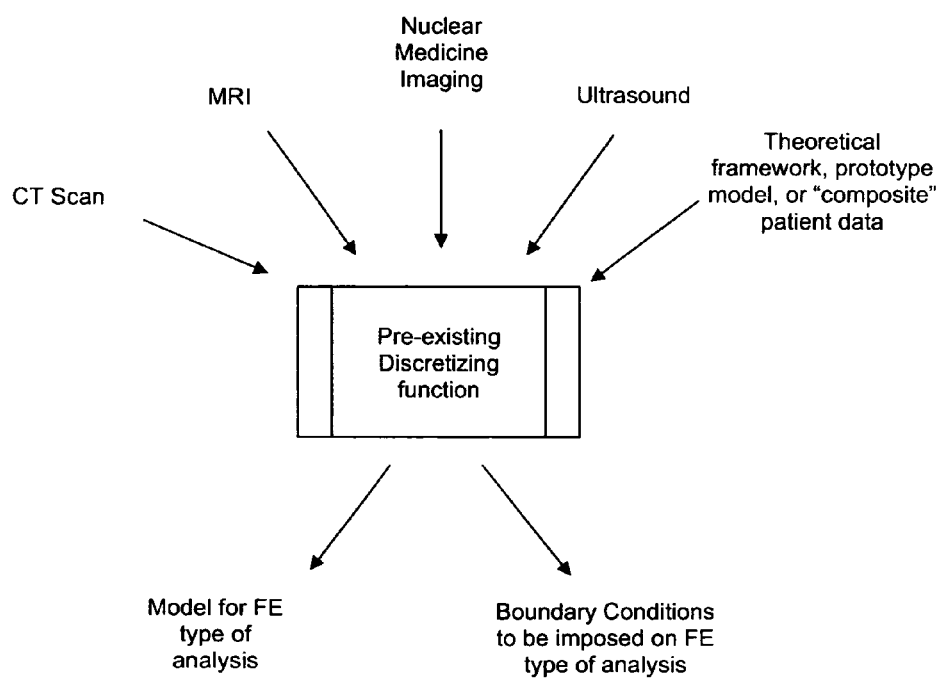
Figure 4: Creating multiple diagnostic imaging based models for an archive/database Figure 5: Creating multiple high resolution FE models for an archive/database
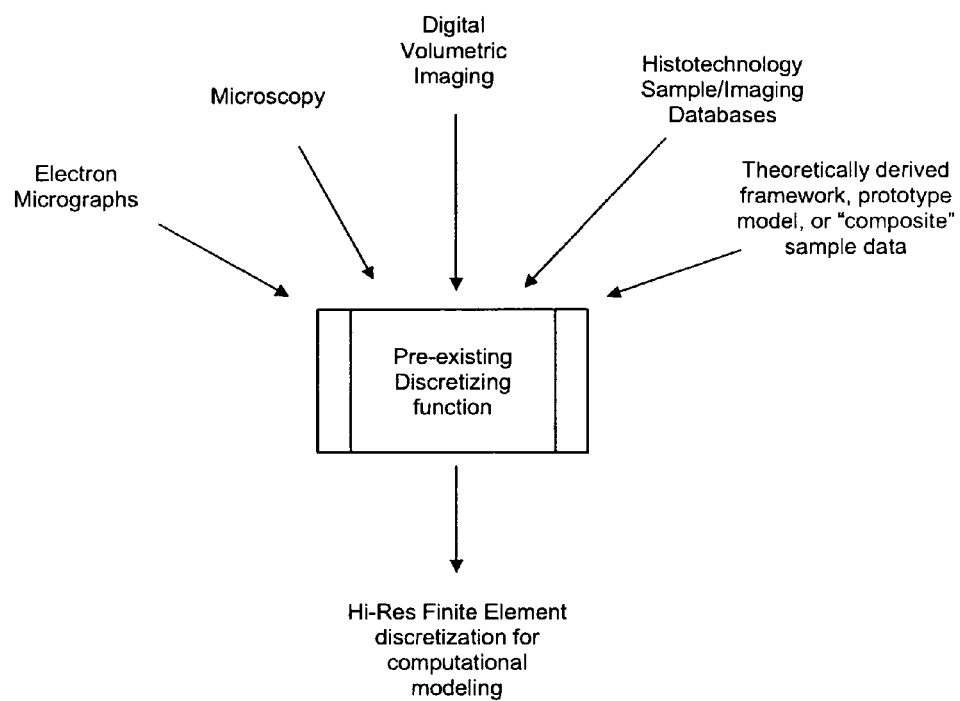
Note: the inputs to the discretizing function may represent healthy or varying types/degree of pathology. The images on data on the input side or the models discretized models on the output side may be sorted by age, gender, race, height, weight, patient history.

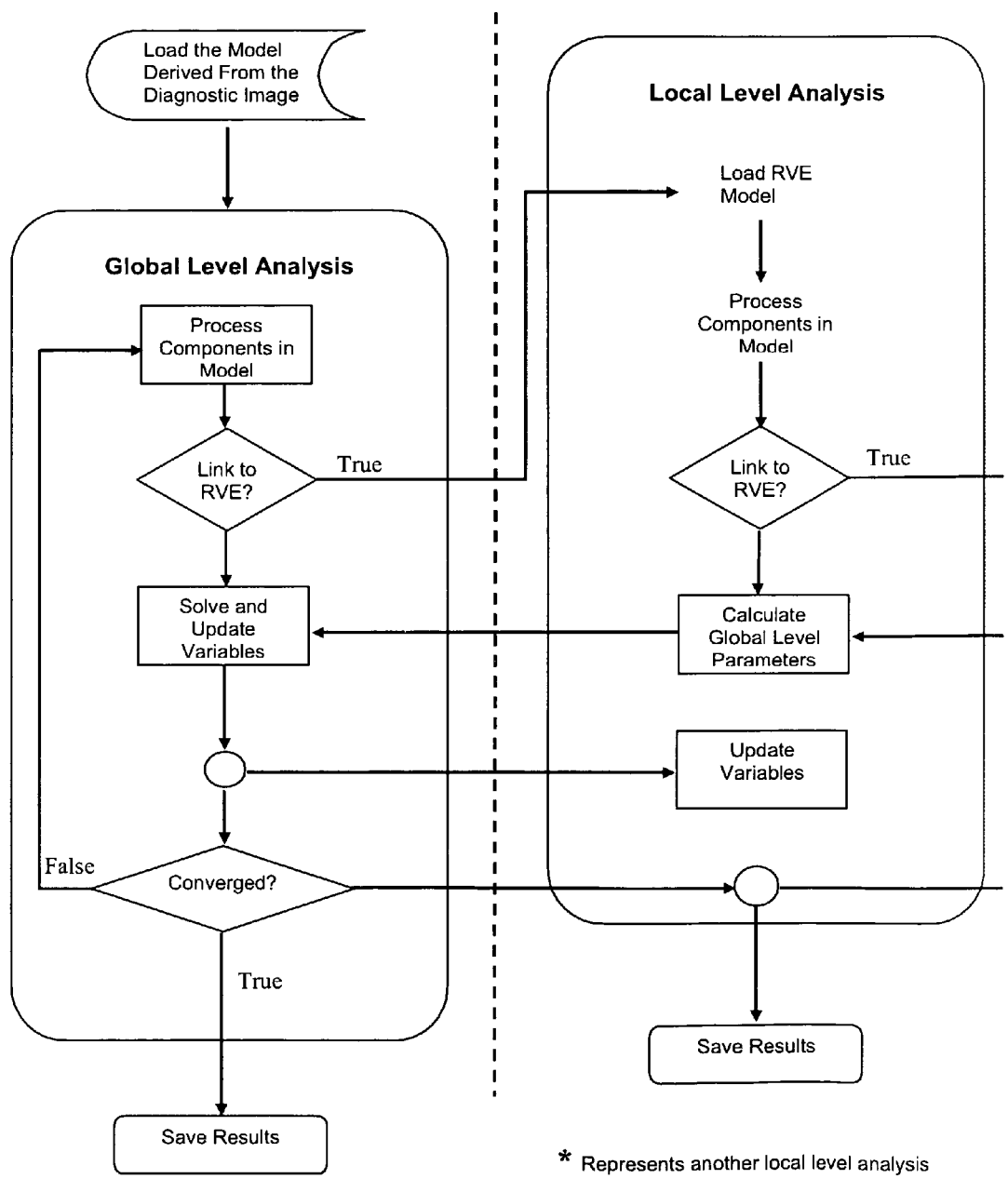
Figure 6: Detail of Multi-level Modeling Process
* Represents another local level analysis

VIRTUAL RESOLUTION ENHANCEMENT IN DIAGNOSTIC IMAGING USING FEA

CROSS-REFERENCE TO RELATED APPLICATIONS

This is a continuing non-provisional patent application of U.S. Provisional Patent Application Ser. No. 60/680,076, entitled METHOD FOR ACHIEVING "VIRTUAL RESOLUTION ENHANCEMENT" OF A DIAGNOSTIC IMAGING MODALITY BY USING COUPLED FEA ANALYSES and filed on 12 May 2005 by Mark L. Palmer and Mark B. Willis, now abandoned, the disclosure of which is incorporated here by reference.

BACKGROUND OF THE INVENTION

The present invention relates to the field of diagnostic medical imaging and provides a method for achieving "virtual resolution enhancement" (VRE) using coupled multi-level analyses for the purpose "zooming in" on a diagnostic image. The invention describes linking established technologies to create new functionality that displays via a user interface, variables of interest in order to provide information beyond the native resolution of a diagnostic medical image. For the purposes of this discussion, diagnostic medical imaging will also be referred to as non-invasive imaging since the term refers to collecting an image without puncturing or cutting the skin or otherwise entering the patient with a tool or device.

Medical imaging has become a vital component in the detection, diagnosis, and treatment of disease. The advantage of imaging in the clinical setting is the capability to obtain information about how the body is functioning while causing minimal disturbance to the system. Using techniques such as magnetic resonance imaging (MRI), computer aided tomography (CT or CAT scans), nuclear medicine imaging (e.g. PET scans), or ultrasound, medical science has the means to view structures, organs, and tissue within the body without altering the anatomy. If further information is necessary to make a diagnosis or to determine the optimal intervention, invasive techniques are used, that is techniques requiring puncturing or cutting the skin or otherwise entering the body of the patient. These typically involve collecting a sample of a tissue using techniques such as needle biopsy or surgery. Further imaging may be performed on tissue samples via histopathology techniques which use combinations of stains, chemicals, antibodies, or markers in combination with a variety of microscopy techniques to identify among other things cells, proteins and architecture. In addition, functional histology can be performed to assess the health and activity of the cells within the tissue sample.

The techniques beyond diagnostic imaging are required because the information necessary for the clinician to intervene exists below the resolution of the diagnostic image. This limitation exists because in order to obtain an image, energy must be transmitted to the patient. The resolution that can be obtained is constrained both by the mode of energy (e.g. x-rays, electromagnetic energy, sound waves) as well as guidelines for safe dosages of that energy mode to the patient. For example, a CT scanner uses energy in the form of x-rays to obtain images. However, taking into account the limitations of allowable dosage range for x-ray radiation to a patient, CT scans are approximately 80% of the way to the theoretical physical limit on the order of 0.5 millimeters (1 millimeter=$10^{-3}$ meters). Therefore while rapid improvements are made in the rate and manner that CT images are captured, processed and presented, there remains a barrier to the resolution that can be achieved. When CT is used on tissue samples outside the body, resolutions on the order of 5 microns (1 micron=$10^{-6}$ meters) are possible depending on the tissue type.

Unfortunately, the physical limitations of non-invasive imaging present a problem to the clinician. Events that govern the pathology or evolution of a disease process in a patient often occur at the cellular level or the protein level which are several orders of magnitude lower resolution than can be obtained via diagnostic imaging. Likewise the response of the body or tissue to an intervention such as placement of a cardiac stent or implantation of a prosthetic device is also mediated at the cellular and protein level. For example, when a patient is assessed for a heart attack, the physician is attempting to learn the state of health of a region of cardiac myocytes, the muscle cells within the heart that generate the force necessary for the heart to pump blood. The question regarding the state of myocytes is whether they are (1) receiving enough nutrients and oxygen to function normally, (2) receiving enough nutrients and oxygen to stay alive but not enough to participate in the normal functioning of the heart, (3) have died due to lack of nutrients and oxygen. The dimensions of an individual cardiac myocyte are approximately 25 microns in diameter by 100 microns in length (1 micron=$1 \times 10^{-6}$ meters). The current resolution of a high-resolution CT scanner has only recently achieved resolutions of approximately 1 mm (1 mm=$1 \times 10^{-3}$ meters). Therefore to increase the probability that the clinician will make the correct diagnosis, multiple tests are performed including electrocardiograms to assess the electrical activity of the heart, a variety of laboratory tests to determine levels of cardiac enzymes, stress tests potentially involving ultrasound of imaging, perfusion tests or nuclear imaging, techniques for assessing vasculature, as well as CT scans These tests are performed while the clinician is racing against the clock because once a myocyte dies the myocyte is not replaced or regenerated by the body and loss of the contracting capability of cardiac cells or death of cardiac cells may lead to death of the patient.

The prior art contains descriptions of computer models in the form of finite element methods applied to discretizations constructed from diagnostic images. These include finite element analyses of breast tissue constructed from MRI data sets (Azar, 2002), idealized left ventricle of a heart (Watanabe, 2004), an average or composite representation of the left and right ventricle from a pig heart (Smaill, et al 2004), MRI data of vascular compromise in the hearts of sheep (Walker, et al 2005). More recently, a review article by Carter (2005) discusses the application of the finite element method to image guided surgery using various type of imaging modalities. Although these references show the use of computational modeling in conjunction with diagnostic imaging, the technology is limited to providing calculation of variables at the level of the diagnostic image. Multilevel methods have wide us in the field of composites where the techniques are used to analyze the behavior of a complex material at the level where the constituent materials are mixed. Multilevel techniques have been applied to biological problems in a localized manner such as trabecular bone microstructure (Hollister, et al., 1991), cartilage microstructure (Wu and Herzog, 2002), articular cartilage (Schwart et al., 1994), and the annulus fibrosis of the vertebral disc (Yin et al., 2005), and heart (May-Newman, et al., 1998). These reports, though important for establishing the efficacy of the prior art, focus on developing descriptive parameters for the tissue in question but do not involve diagnostic imaging or boundary conditions corresponding to a physiological loading.

The present invention is based on the hypothesis that the capability to "zoom in" on a non-invasive diagnostic image would be advantageous in the clinical setting as well as in the medical research setting. The potential to display clinically relevant variables determined by multilevel computational modeling on a diagnostic image as well as on higher resolution images that potentially represent the patient's pathology may allow the clinician to leverage additional information that could prove critical in correct diagnosis and rapid treatment of a patient. Likewise in the research setting, the potential to "zoom in" on an image or to view relevant variables on models across multiple size scales and to view interactions from the cellular level to the tissue level may facilitate the design of clinical interventions and devices.

BRIEF SUMMARY OF THE INVENTION

The present invention is a method for achieving transfer of information from a diagnostic image to a framework for performing a multilevel mathematical analysis then displaying the results of the analysis on either the model at the resolution of the diagnostic image or on the models representing the higher resolution images. A further possibility is to map the results directly onto the source diagnostic image or the source high resolution image(s).

The method requires that computational models at two or more resolutions are available for analysis. In a first embodiment of the method, the lowest resolution is obtained from diagnostic imaging by X-rays, CT scans, MRI, ultrasound or some other non-invasive technique. The information is discretized so that a finite element model in two dimensions or three dimensions can be constructed from the image. The discretization step transforms the imaging information into entities that can be operated on by a finite element based mathematical modeling tool. The entities used in the finite element method are (i) nodes which are points in the analysis where variables of interest are calculated and (ii) elements which are regular shapes defined by nodes and are used to define the areas or volumes within the model. Elements are also the predefined entities where mathematical operations are performed representing the interaction between nodes in the model. Higher order entities may also be defined in the discretization step such as lines, planes, and surfaces. The higher resolution image(s) may be collected from tissue samples at the same time or separated temporally from the diagnostic image. Depending on the physiology or pathology in question, these higher resolution images may be obtained using microscopy coupled with histology techniques for identifying cells, proteins, and other structures. The imaging performed from these samples also undergo discretization to produce models suitable for finite element method based analyses.

The first embodiment also involves a multilevel mathematical modeling tool in the form of the asymptotic homogenization method. In this method, the higher resolution model(s) is referred to as a representative volume element or RVE. The elements in the low resolution model derived from the diagnostic image can each be linked to their own constitutive law which is the mathematical description of their behavior or linked to an RVE. The behavior of the element linked to the RVE is defined by the mathematical model that relates the constitutive law for the elements of the RVE with the data supplied from the element in the lower resolution model. In the asymptotic homogenization method, the same RVE can be linked to multiple elements in the low resolution model. An attractive feature of the asymptotic homogenization method is that when the same RVE is linked to multiple elements, the solution generated at each linked element is allowed to evolve independently during the course of an analysis. In addition, the homogenization method can be applied recursively so that the elements within an RVE may in turn be linked to an RVE constructed at a higher resolution. These are important features allowing independent sets of output variables to be generated at different elements within a model and also recursively across multiple levels of resolution in an analysis.

The first embodiment further involves the use of a graphical user interface. The interface is capable of reading the output data generated by the multilevel analysis and mapping the information in graphical form on each of the models used in the analysis. In this embodiment, the process is achieved using a standard FEA post-processing tool. The standard FEA post-processor also facilitates rotation, animation, and creating cross-sections through the model providing additional information for the user. Graphical user interfaces capable of handling both finite element models and imaging data sets facilitate mapping the variables of interest directly onto the original images.

A second embodiment of the method involves obtaining the higher resolution model from a database or archive of previously collected images and models. These models may be derived from other patients, species, or constructed based on a theoretical understanding of the physiology or pathophysiology. In this embodiment, the higher resolution model is matched to the patient based on medical history as well as physical parameters such as height, weight, gender, age, race or other demographic information. Another use for this embodiment is the ability to probe the behavior diagnostic model by coupling the patient's diagnostic image to multiple higher resolution models to determine if it correlates with known physiology or pathophysiology.

Another embodiment uses a prototype model as the high level model. The prototype would be morphed (for example see Sermesant, et al., 2003) to fit the patient anatomy based on a set of parameters measured from the patient. An example is the use of two dimensional ultrasound to measure landmarks on an anatomical structure and then morphing the prototype model of the anatomical structure to fit the patient. This embodiment has the potential to reduce the cost in the clinical setting since a cheaper imaging modality may be used at the time the patient is evaluated. The boundary conditions necessary for the analysis step may also be determined using an imaging modality that is lower cost or more readily available than MRI or CT.

Still another embodiment uses an archive of images or models. The patient history and physical parameters such as height, weight, gender, age, race or other demographic information are used to select a predefined model that most closely matches the patient. This embodiment has the further potential of reducing cost and time required for the analysis. In this case the lower cost or lower resolution diagnostic imaging modality may be used to further aid in the matching of a model to the patient as well as determining the boundary conditions for the analysis.

The method described herein is preferably performed on an apparatus that is capable of graphically representing the diagnostic imaging data taken from the patient, performing the discretization step for the imaging data at each resolution and gives the user the opportunity to select which elements or regions of a model will be linked to a higher resolution model. The apparatus should then be able to perform the multilevel analysis and pass the results to the graphical user interface for visual representation of the results at each resolution defined in the analysis.

In one aspect, the present invention provides a method for achieving "virtual resolution enhancement" of a diagnostic image resulting in data at a resolution beyond that of the diagnostic image.

The invention has the further intent of providing the clinician with a graphical representation either in the form of data mapped onto a computer model(s) or data mapped to a diagnostic image(s) that have been determined based on clinically determined inputs.

The invention has the further intent of providing the clinician with data that can aid in the clinical decision making process.

The invention has the further intent of applying multi-level finite element analysis methods to diagnostic medical imaging so as to provide a model for the interaction between clinically measured parameters and the physiology or pathophysiology of a tissue or entity at resolutions higher than the diagnostic image.

The invention has the further intent of describing a database of images and or models that can be applied to a patient based on medical history, age, race, gender, height, weight or other demographic data that correlate with establishing the diagnosis of a disease or clinical condition.

A reader skilled in the art and by those who practice the invention will recognize additional benefits of this invention from a reading of this disclosure, including the following description of drawings, the detailed description of the invention, and the claims.

BRIEF DESCRIPTION OF THE SEVERAL VIEWS OF THE DRAWING

FIG. 1 is a diagram showing an example of the architecture of skeletal muscle to demonstrate that biological tissues are hierarchical in structure and are suited for the techniques described in this invention.

FIG. 2 is a diagram showing the first embodiment of the method wherein the inputs to the method, the operations that they undergo in each step of the method and the resulting output in accordance with the present invention.

FIG. 3 is a diagram showing the preferred embodiment of the present invention in the clinical setting for aiding in the diagnosis of acute coronary syndrome.

FIG. 4 is a diagram illustrating the variety of diagnostic imaging modalities that can serve as inputs to the model as well as the pre-processing they must undergo in order to be used by the embodiment of the present invention.

FIG. 5 is a diagram illustrating the variety of imaging modalities that can be used to generate higher resolution models that can be mathematically coupled to the diagnostic imaging modality in the present invention.

FIG. 6 is a diagram illustrating the flowchart for the multilevel analysis method used in the preferred embodiment of the present invention.

DETAILED DESCRIPTION OF THE INVENTION

The present invention comprises a method for achieving resolutions higher than those available in a given imaging system by linking via mathematical modeling the image obtained from one imaging modality or setting to higher resolution images obtained in a different modality or setting thereby providing the user with information that would be difficult to visualize or obtain from the original image.

The present invention is predicated on the fact that the information that is present in a given image or sequence of images is may be difficult to interpret with the naked simply by viewing the image, zooming in on the image, or through processing of that image to highlight certain features. In addition, the information contained in the image may be related to other variables that are important to interpreting the image but in a way that may not be obvious even to a person experienced in reading or interpreting the images. This is particularly true in a biological setting because biological structures, tissue or entities tend to be hierarchical in nature. This means that depending on the length or size scale at which one observes the tissue, structure, or entity, another set of features or structures emerge. For example, FIG. 1 shows the organization of skeletal muscle. At the centimeter size scale, the "fibers" or strands of material are evident corresponding to the muscle fascicle. Closer inspection of the fascicle reveals that the fascicle is itself comprised of parallel fibers imbedded in a protein matrix. These fibers are the "true" skeletal muscle fibers and are the cells that give muscle the ability to contract and generate force. At still higher resolution, the parallel myofibrils that constitute the muscle fiber become visible. Further magnification at the micron length scale reveals that the myofibrils are comprised of regular, repeating units called sarcomeres. The sarcomeres are further comprised of proteins that are responsible for the conversion of chemical energy into mechanical energy that gives skeletal muscle the ability to generate force. Although not all biological tissues, structures or entities share the same organization or number of organizational levels that is found skeletal muscle, the function, behavior and health of the tissue is related to the organization and function of the cells and the matrix, either organic or inorganic, in which they are imbedded.

This multilevel organization of biological entities and the dependence of one level of organization upon another level of organization means that there is significant benefit that can be obtained by exploring a tissue or structure across multiple levels of organization. This characteristic also means that knowledge of organization within a level and interaction across levels can be exploited in the setting of diagnostic imaging to provide additional information to the user responsible for interpreting an image.

For the purposes of illustration, the present invention will be described with respect to a clinical setting where an individual presents complaining of chest pain that as been determined to be cardiac in origin, that is attributed to the heart. A preliminary cardiac evaluation includes an electrocardiogram to assess the electrical activity of the heart, vital signs, and a focused history and physical. At this point the patient (subject) is separated into one of four groups. The first two groups constitute patients with definite acute coronary syndrome (ACS) meaning that the cells that make up the heart are compromised and may die. This is the most serious presentation since cardiac cells cannot be replaced or regenerated by the body and the dysfunction or loss of these cells may lead to death. The second two groups of patients are considered lower risk and constitute some 60% of patients who present complaining of chest pain determined to be cardiac in origin. A standard of care for these patients is that they will undergo a cardiac imaging study, increasingly this is in the form of a CT scan, as part of the procedure for arriving at a definitive diagnosis or making a clinical decision concerning their management. Additional modes of imaging may include X-rays, MRI, two dimensional or three dimensional ultrasound, nuclear medical imaging as shown in FIG. 4.

In other medical conditions, a sample can be taken of the tissue in question to aid in identifying the problem or pathology with the tissue. This is not possible in the ACS setting because (1) sampling cardiac tissue may lead to death of the patient (subject), (2) the tissue removed is not replaced by the heart, and (3) procedure is complicated by the constant motion of the heart. Cardiac CT involves obtaining high speed images of the heart corresponding to different phases in the cycle of repetitive motion that the heart undergoes. These images can be assessed for gross measures such as (1) thickness of the heart wall, (2) the amount of blood that is ejected from the heart with each beat, (3) the motion of the heart wall, and (4) if dye is introduced then the patency of the vessels feeding the muscle of the heart wall. Although there is a wealth of research concerning how to interpret these measures, the ability to rely solely on a CT scan or other diagnostic imaging modality remains elusive so there remains a demand for more costly imaging, additional modes of testing, and increased time to conclusive diagnosis.

At this point in the care of the patient, the present invention becomes relevant. By exploiting knowledge of the organization of cardiac tissue down to the level of the cardiac cells that generate the force necessary for the heart to beat, called myocytes, additional information may be obtained from diagnostic imaging such as a CT scan. FIG. 3 shows the preferred embodiment for the application of the present method to ACS. FIG. 3A shows that once the diagnostic cardiac CT study is performed on a patient (subject) the images can be passed to a pre-existing discretization function (FIG. 3B). The discretization function which is also referred to in the literature and commercially as a segmentation function is capable of acting upon the imaging data to produce models that can be interpreted by mathematical models that make use of the finite element method. This means that the discretization function converts the image into a model with the spatial resolution corresponding to image. The model contains (1) nodes which are coordinates within the model where variables will be calculated, determined from a look-up table, or otherwise determined; (2) elements which are made up of nodes, used to distinguish one region of the model from another for the purpose of calculating how nodes are related to each other, and defines a region over which a constitutive law that provides the mathematical description of the material in that region behaves.

Since the cardiac tissue of a patient cannot be sampled directly due to the reasons mentioned previously, the higher resolution model must be obtained by an alternative means for this embodiment and application of the invention as shown in FIG. 3E. This may be in the form of a database of images obtained from biopsy samples taken from cadavers, other animal species, or other patients that have already undergone pre-processing by the discretizing function to generate models. Another possibility is building a prototype or composite model for the higher resolution representation of cardiac tissue.

The additional requirements in the pre-processing step or in moving from the pre-processing step to actually performing a multilevel analysis is the ability to (1) assign constitutive laws to the elements produced in the discretizing function, (2) link regions of the diagnostic imaging model to higher resolution models called representative volume elements (RVE's), and (3) the ability to specify boundary conditions for the analysis to be performed. In this embodiment, the boundary conditions are obtained by identifying a CT image corresponding to the a resting or neutral configuration of the heart in the cardiac cycle then determining the movement of the nodes or points of interest with respect to that image. This will be termed a displacement boundary condition. Other types of boundary conditions may be chosen and the image that is used as the reference image may be arbitrary as long as the user is able to define parameters in the starting configuration sufficiently to perform the analysis, termed the initial conditions. The use of boundary conditions, initial conditions, constitutive laws, and RVE's are common to a person skilled in the art.

Several discretizing functions are available commercially. ScanIP by Simpleware LTD and Amira by Mercury Computer Systems are two products that are capable of carrying out the discretization of CT or MRI images to the computer models that can be processed by finite element based analyses. Additional discretizing functions include the software package Hypermesh by Altair Engineering. Other techniques for accomplishing the goal of discretization exist in the prior art. One option is directly converting the pixels or voxels in the image to nodes and elements. This method is demonstrated and discussed in the journal article by Hollister and Reimer (1993). The drawback of this method is that a very large number of elements are generated making this technique expensive in terms of computational resources and increasing the time necessary to generate a solution. In this embodiment the surfaces and nodal positions at each cardiac phase were reported by the CT Brilliance System by Philips and imported into Hypermesh to generate the mesh of a heart along with the boundary conditions. The Hypermesh software then served as the discretization function.

The next step is performing the multilevel analysis as shown in FIG. 3F. The preferred embodiment is the asymptotic homogenization method discussed in Palmer, 2002 or Takano, 2000. A framework for multi-physics homogenization is also presented by Yu, 2002. Other types of multilevel analyses are also exist in the prior art including methods based on variational principles, probabilistic approaches, and self-consistent schemes. Although other multilevel schemes may be used with the present invention, the asymptotic homogenization method was chosen for this embodiment because RVE's are allowed to evolve uniformly across the model during the course of a analysis and the asymptotic homogenization method may be applied recursively, that is an element within an RVE may be linked to another RVE at a higher resolution. The flowchart for accomplishing the asymptotic homogenization method is shown in FIG. 6. The model generated by the diagnostic image is treated as the global level model. The method requires that the analysis know whether an element or region of the global model has a defined constitutive law or will obtain the behavior from an RVE also known as the local level model. As the analysis proceeds, if a component of the model is encountered that is linked to an RVE, another analysis is spawned that performs the necessary calculations to provide the information necessary for that component of the model. A user skilled in the art can develop means for taking advantage of CPU or multi-CPU architecture to accomplish this task most efficiently. At every cycle through the analysis process, solutions are generated for each node, element, or component of the model as well as each RVE irrespective of whether the RVE is initially in the same configuration or is the same model as the RVE in another part of the global model. In this way, each region of the model evolves its own solution. As shown in FIG. 6, the analysis continues until a convergence criterion is reached signifying that the analysis is complete. FIG. 6 also shows that an RVE may itself be linked to another RVE creating a recursive structure for performing analyses across more than two levels.

The multilevel computational method makes it possible to link the constitutive law governing the behavior of materials that comprise an entity across multiple computational models constructed at different resolutions. In this way, when an input variable is provided, the effect is pushed through each level of computational models and the output is determined as a function of (1) the constitutive laws at work within a level and (2) the interaction between neighboring levels. In the case of the patient (subject) being assessed for ACS, a CT scan of the heart provides a series of images of the heart at different time points during a contraction. These time points serve as boundary conditions defining the motion and thickness of the heart wall. The multilevel modeling framework in conjunction with the mathematical description of the behavior of cardiac tissue converts the boundary conditions into information that is pushed to the higher resolution models. The impact of boundary conditions are then determined in the higher resolution models based on the mathematical description governing the behavior at that level. The information calculated at the higher resolution is then used to update the state of the structure at the lower resolution. The cycle is then continued until a solution is obtained.

Once convergence is achieved, the results are then available for the post-processing step shown in FIG. 3J-L. The graphical user interface function provides the capability to display the results from the analysis on the global level model derived from the diagnostic image or on the higher resolution model(s) or RVE(s). In this embodiment the graphical user interface is the same as the software that provided the discretization function, namely Hypermesh. However, the method is not limited to this user interface. A person skilled in the art can see from the present invention that several capabilities or features could enhance how the data is presented to the user.

The user in the ACS setting now has a graphical representation of the diagnostic image of the heart in the reference configuration in the form of a computer model. The user can display on the model vector and scalar quantities calculated by the analysis showing the displacements in the model, stresses, strains and any additional output parameters calculated in the analysis. Although these output variables are dependent on the initial conditions provided by the initial cardiac CT scans, the relationship of the boundary conditions to the output parameters may be complex making the interpretation difficult or impossible from the diagnostic without the help of analytical method. This is the basis for the prior art using traditional finite element analyses in conjunction with diagnostic imaging. The present invention provides the additional feature of using the additional information concerning the structure at higher resolutions to provide a mapping of the output variables to proteins and cells represented within the higher resolution models. The user can access the higher resolution model and display these variables. In addition, the exact same global level analysis may be performed except that each version uses a different RVE representing some physiological state. One RVE may correspond to a region of dead cells, another may correspond to a region of poorly functioning cells, and still another may correspond to a region of healthy cells. In the clinical setting, the results from these three distinct analyses can be compared with the data collected by the initial sequence of cardiac CT scans to identify which scenario most closely corresponds to the condition of the heart of the patient in question. A person skilled in the art will recognize other ways to leverage the virtual resolution enhancement technology in the diagnosis of ACS. Consequently, this tool provides the clinician with the ability that did not exist before to leverage information at resolutions beyond the resolution of the cardiac CT scan to aid in the diagnosis and treatment of an ACS patient.

The preferred embodiment for the invention applied to the diagnosis of ACS is using the multilevel model described by Palmer (2002). This embodiment will enable the user in the clinical setting to distinguish stresses generated due to the passive response from the stresses generated due to the ability of muscle to convert chemical energy to mechanical energy. Additionally, this embodiment also allows for large deformation of materials and nonlinearity of response. Because of the ability to distinguish active and passive stresses, this embodiment would further facilitate performing the virtual resolution enhancement method using RVE's corresponding to known cardiac pathologies where the force generating capacity of the tissue can range from full force generation capability in conjunction with the passive response to purely a passive response with no force generating component due to lack of oxygen and nutrients available to a region of cardiac cells or death of cardiac cells.

Another embodiment may involve the multilevel analysis described by Yu (2002). This embodiment would limit the user to linearity of response, but allow the user to model multiphysics responses in cardiac tissue. This means that the user could, for example, visualize the interaction between stress, strain, and conductivity of the heart muscle.

A user skilled in the art can conceive of further embodiments involving different types of multilevel methods that would provide the ability for the clinician to visualize parameters relevant to ACS and would be advantageous in making a diagnosis in the clinical setting.

FIG. 4 demonstrates that another embodiment of the present invention in the setting of diagnosis of ACS may involve using diagnostic images obtained by means other than CT, at a time other than the current presentation of the patient, or because a CT scanner is not available at the time of presentation. In this case, an archive can be constructed that contains CT scans of this patient or other types of diagnostic imaging modalities. An interface with the archive may also be constructed that allows the user to select an archived image based on medical history, demographic criteria, or other physical measure of the patient (subject). A similar interface may be constructed to access archives containing boundary conditions and constitutive laws. The user may also choose an embodiment in which a "composite" or prototype heart that can be altered or morphed (see Sermesant, et al., 2003) instead of using the embodiment in FIG. 3. An archive or prototype model may be advantageous in the ACS setting because it may increase the speed of passing through the pre-processing step of the present invention. In addition, the possibility of substituting another diagnostic imaging modality or eliminating the need for emergent imaging may reduce the dependence upon expensive and or complex imaging resources thereby reducing time and cost of reaching a diagnosis. As identified previously, the accuracy and efficacy of the virtual resolution enhancement system is subject to inputs to the method including constitutive laws, initial conditions, and boundary conditions necessary for the analysis.

FIG. 5 illustrates the possible sources for the high resolution models that constitute the RVE used in the local level of the analysis in FIG. 6. This component of the system can also incorporate an embodiment consisting of an archive of pre-existing models and images. The quality of this archive is contingent upon how well the models or images correspond with the patient in question or how well they are able to reproduce the behavior necessary to define the region of the global model that they represent. This component of the present method is simpler than the component in FIG. 5 because it is not required to possess or have access to the additional information concerning boundary conditions.

The present invention is not limited to cardiac tissue in the setting of acute coronary syndrome. As should be evident to a reader skilled in the art, the method presented in this invention can be applied to other tissues, organs, structures, or entities using any combination of imaging modalities. In addition, the accuracy of the proposed invention subject to the limitations of the mathematical model employed. Furthermore, it is necessary to recognize that improved accuracy of the method may not depend solely on achieving higher resolutions in the linked models to provide a realistic physical representation of the actual structure but may also be achieved through linking an abstraction of the structure that matches its behavior in a meaningful way.

One having ordinary skill in the art and those who practice the invention will understand from this disclosure that various modifications and improvements may be made without departing from the spirit of the disclosed inventive concept. Such modifications should be considered within the scope of the claims that follow.

I claim:

1. A method for assembling technologies to achieve virtual resolution enhancement of a diagnostic image, comprising:
   a) receiving a low resolution entity that is one of a set of diagnostic images that is processed by a function that performs discretization to generate a low resolution model and a low resolution model generated by a discretization function that is representatively comprising, images and objects, visualized in a diagnostic image;
   b) receiving a set consisting of at least one higher resolution entity such that:
      (i) a higher resolution entity is one of a set of higher resolution images that is processed by a function that performs discretization to generate a higher resolution model and a higher resolution model generated by a discretization function;
      (ii) at least one higher resolution entity is linked to the low resolution entity;
      (iii) any remaining higher resolution entities are linked to at least one of the low resolution entity and a higher resolution entity;
   c) an image discretization function capable of at least one of:
      (i) processing an image to create a model consisting of objects recognizable by a mathematical modeling function;
      (ii) processing multiple images to create a model consisting of objects recognizable by a mathematical modeling function;
      (iii) creating a model de novo consisting of objects recognizable by a mathematical modeling function;
   d) a multilevel mathematical modeling function capable of at least:
      (i) performing an analysis linking a low resolution model and at least one higher resolution models;
      (ii) performing an analysis based on at least one of the following: previously obtained measures, a look-up table, and the theoretical model for the behavior of a tissue(s) or entity(s);
      (iii) generating output variables for each model involved in the analysis;
   e) a user interface that enables:
      (i) accessing the output variables generated by the multilevel modeling function;
      (ii) viewing at least one output variable at the length scale of the low resolution entity;
      (iii) viewing at least one output variable at the length scale of a higher resolution entity.

2. The method of claim 1, further comprising employing finite element methods to perform the mathematical modeling function to generate variables of interest.

3. The method of claim 2, further comprising at least one of a set of processes that include: linking multiple finite element analyses; employing asymptotic homogenization methods to perform a multi-level analysis;. mapping the variable(s) of interest to the model generated at the level of the diagnostic image; mapping the variable(s) of interest to the higher resolution model(s) derived from theoretical or alternative imaging techniques at a length scale smaller than the resolution of the diagnostic image; and using the physical behavior of the system obtained by the diagnostic image or by other means as inputs to the mathematical model.

4. The method of claim 2, further comprising employing asymptotic homogenization methods to perform a multi-level analysis and further comprising inputs to the higher resolution mathematical model being used to generate the behavior of an entity in a lower resolution model.

5. The method of claim 1, further comprising using the diagnostic image to create the model of an entire tissue or entity, or a sub-section of a tissue or entity.

6. The method of claim 1, further comprising an archive of at least one of high resolution and low resolution data regarding known physiology or pathophysiology.

7. The method of claim 1, further comprising comparing the variables of interest with an archive or data on patients with known physiology or pathophysiology.

8. The method of claim 1, further comprising modeling in a single physics or multi-physics domain.

9. The method of claim 8, further comprising modeling in the force-displacement domain.

10. The method of claim 1, further involving modeling of active force generation in a tissue such as skeletal muscle, cardiac muscle, smooth muscle wherein the tissue can generate an internal stress by converting chemical energy into mechanical energy.

11. The method of claim 10, further involving modeling of active force generation across multiple resolutions or models.

12. The method of claim 1, further involving a graphical user interface that is able to access or otherwise work with information about how models at different resolutions or images at different resolutions are linked to each.

13. The method of claim 12, further involving the ability to access or otherwise work with information or data not contained in the original image or models.

14. The method of claim 12, further involving the ability to select a region of interest in a given model or image and thereby access the next image(s) and/or model(s) linked or otherwise associated with that region.

15. The method of claim 14, further involving the ability to move between a high resolution image and a low resolution image repeatedly until the highest or the lowest resolution model or image is reached.

16. The method of claim 12, further involving the ability to move from a high resolution image to a lower resolution image.

17. The method of claim 13, further involving the ability to display information or data not contained in the original image or model onto the image or model.

18. The method of claim 12, further involving the ability to simultaneously display or superimpose the image and the model derived from the image.

19. The method of claim 12, further involving the ability to access and otherwise work with information or data not contained in the original image or models; the ability to display information or data not contained in the original image or model onto the image or model; and the ability to simultaneously display or superimpose the image and the model derived from the image.

* * * * *